United States Patent
Feller et al.

(10) Patent No.: US 8,495,858 B2
(45) Date of Patent: Jul. 30, 2013

(54) METHOD OF OPERATING A GAS TURBINE POWER PLANT WITH AUXILIARY POWER TO REDUCE EMISSIONS

(75) Inventors: Gerald J. Feller, Orlando, FL (US); Alan K. Kortgoede, Orlando, FL (US); Gilberto Miranda-Velazquez, Sanford, FL (US)

(73) Assignee: Siemens Energy, Inc., Orlando, FL (US)

( * ) Notice: Subject to any disclaimer, the term of this patent is extended or adjusted under 35 U.S.C. 154(b) by 895 days.

(21) Appl. No.: 12/639,431

(22) Filed: Dec. 16, 2009

(65) Prior Publication Data

US 2011/0138771 A1 Jun. 16, 2011

(51) Int. Cl.
*F02C 6/00* (2006.01)
*F02G 1/00* (2006.01)
*F02G 3/00* (2006.01)

(52) U.S. Cl.
USPC .......... 60/39.182; 60/39.5; 60/777; 60/39.55; 60/299; 122/7 R; 122/7 B

(58) Field of Classification Search
USPC ............. 60/39.182, 39.5, 39.55, 39.465, 299, 60/775, 777, 39.3, 39.53, 39.54, 806; 122/7 R, 122/7 B; 290/52
See application file for complete search history.

(56) References Cited

U.S. PATENT DOCUMENTS

| | | | |
|---|---|---|---|
| 4,353,207 A | 10/1982 | Lee | |
| 4,572,110 A * | 2/1986 | Haeflich | 122/7 R |
| 4,811,555 A * | 3/1989 | Bell | 60/777 |
| 4,875,436 A | 10/1989 | Smith et al. | |
| 5,308,810 A * | 5/1994 | Voss et al. | 502/28 |
| 5,493,854 A | 2/1996 | Nielsen | |
| 5,564,269 A | 10/1996 | Briesch | |
| 5,678,401 A * | 10/1997 | Kimura | 60/39.182 |
| 6,125,623 A | 10/2000 | Cloyd et al. | |
| 6,266,953 B1 | 7/2001 | Ramstetter et al. | |
| 6,644,011 B2 * | 11/2003 | Cheng | 60/39.182 |
| 6,851,266 B2 * | 2/2005 | Liebig | 60/772 |
| 7,107,774 B2 * | 9/2006 | Radovich | 60/778 |
| 7,146,795 B2 * | 12/2006 | Pelini | 60/39.55 |
| 2001/0032468 A1 * | 10/2001 | Okusawa et al. | 60/653 |
| 2007/0214766 A1 * | 9/2007 | Obana et al. | 60/39.15 |
| 2010/0180567 A1 * | 7/2010 | Nattanmai et al. | 60/39.182 |
| 2011/0006529 A1 * | 1/2011 | Rose et al. | 290/52 |
| 2011/0030331 A1 * | 2/2011 | Tong et al. | 60/39.5 |
| 2011/0036066 A1 * | 2/2011 | Zhang et al. | 60/39.5 |

* cited by examiner

Primary Examiner — William H Rodriguez

(57) ABSTRACT

A method of operating a gas turbine power plant including an auxiliary power output for reducing power plant emissions. A heat recovery steam generator receives an expanded working medium from a gas turbine and removes heat from the expanded working medium to form a reduced temperature exhaust gas and to generate steam from the heat removed from the expanded working medium. A steam turbine and generator assembly operates on the steam to produce an auxiliary plant output. A selective catalytic reduction (SCR) system is provided for receiving the reduced temperature exhaust gas; and an auxiliary fan is powered by the auxiliary plant output to supply dilution air for further reducing the temperature of the exhaust gas to prior to passing the exhaust gas through the SCR system.

20 Claims, 1 Drawing Sheet

US 8,495,858 B2

METHOD OF OPERATING A GAS TURBINE POWER PLANT WITH AUXILIARY POWER TO REDUCE EMISSIONS

FIELD OF THE INVENTION

The present invention relates generally to gas turbine power plants and, more particularly, to a method of operating a gas turbine power plant including an auxiliary power plant unit comprising a steam cycle to provide auxiliary power to reduce emissions produced at the gas turbine power plant.

BACKGROUND OF THE INVENTION

The low capital cost, short lead times and flexibility of gas turbine-based power plants make them particularly attractive to electrical utilities as a means for generating electrical power. Typical simple cycle power plants (SCPPs) generally consist of a gas turbine and an exhaust stack. The emissions from such power plants, such as nitrogen oxides ($NO_x$), are controlled by local government regulations. Hence, if the expected $NO_x$ levels are too high to meet government regulations, the power plant design must be altered or the power plant may not be allowed to operate commercially.

One approach to reducing elevated $NO_x$ emissions is adding a selective catalytic reduction (SCR) system to the power plant that uses a reductant, i.e., ammonia, injected into the exhaust gas from the turbine which, after a catalyzed reaction, reduces the $NO_x$ emissions. Power plant applications of SCR systems for $NO_x$ reduction are typically implemented in combined cycle power plants, i.e., power plants having a gas turbine and a stream turbine and associated generators for providing an output to a power grid. In combined cycle power plants, the exhaust gas from the gas turbine is used to produce steam in a heat recovery steam generator (HRSG), commonly operating at plural pressure levels, and the steam is used as a working medium in the steam generator to thereby increase the net output of the power plant. The SCR system typically operates in a temperature range of 500° F. to 850° F., corresponding to the temperature of the flue gas provided at the exit of the HRSG.

In SCPPs, the lack of heat exchanging surfaces at the exit of the gas turbine results in temperatures that substantially exceed 850° F., i.e., higher than the optimum operating temperature for SCR systems. Operation of SCR systems at temperatures greater than 850° F. may result in unwanted chemical reactions and may shorten the expected life of the material in the SCR system. Fans have been included in the exhaust stream equipment for SCPPs to provide ambient air to mix with and cool the flue gas exiting the gas turbine. However, the fans required for supplying the cooling air add an auxiliary power requirement to the power plant. In order to optimize the power output of SCPPs, such plants are generally designed to have very low auxiliary power requirements, such that addition of auxiliary cooling fans associated with incorporation of an SCR system generally can result in a relatively large increase in the auxiliary power requirement for the plant, and an associated decrease in the net power output.

SUMMARY OF THE INVENTION

In accordance with one aspect of the invention, a method is provided for implementing an auxiliary power output of a gas turbine power plant to reduce emissions of the power plant. The method comprises: providing a gas turbine and generator assembly; operating the gas turbine with a fuel to produce a hot working medium producing work and creating an expanded working medium; removing heat from the expanded working medium leaving the gas turbine in a heat recovery steam generator (HRSG) to form a reduced temperature exhaust gas; generating steam in the HRSG from the heat removed from the expanded working medium; passing the reduced temperature exhaust gas through a selective catalytic reduction (SCR) system; providing an auxiliary plant power unit comprising a steam turbine and generator assembly; operating the steam turbine with the steam generated in the HRSG to produce an expanded steam exhaust, and producing an auxiliary plant output at the generator connected to the steam turbine; and using the auxiliary plant output to produce a supply of dilution air, and providing the dilution air to the reduced temperature exhaust gas to effect a further reduction of temperature of the exhaust gas prior to passing the reduced temperature exhaust gas through the SCR system.

In accordance with another aspect of the invention, a method is provided for implementing an auxiliary power output of a gas turbine power plant to reduce emissions of the power plant. The method comprises: providing a gas turbine and generator assembly; operating the gas turbine with a fuel to produce a hot working medium producing work and creating an expanded working medium; removing heat from the expanded working medium leaving the gas turbine in a heat recovery steam generator (HRSG) to form a reduced temperature exhaust gas; generating steam in the HRSG from the heat removed from the expanded working medium; passing the reduced temperature exhaust gas through a selective catalytic reduction system; providing an auxiliary plant power unit comprising a steam turbine and generator assembly; operating the steam turbine with the steam generated in the HRSG to produce an expanded steam exhaust; and providing the expanded steam exhaust to the gas turbine to increase an energy level of the hot working medium.

In accordance with a further aspect of the invention, a gas turbine power plant is provided implementing an auxiliary power output of the power plant to reduce emissions. The power plant comprises a gas turbine and generator assembly for producing power. The gas turbine operates with a fuel to produce a hot working medium producing work and creating an exhaust gas comprising an expanded working medium. A heat recovery steam generator (HRSG) is provided for receiving the expanded working medium and removing heat from the expanded working medium to form a reduced temperature exhaust gas and to generate steam from the heat removed from the expanded working medium. A steam turbine and generator assembly is provided for producing power from the steam generated at the HRSG to produce an auxiliary plant output. A selective catalytic reduction (SCR) system is provided for receiving the reduced temperature exhaust gas; and an auxiliary fan is powered by the auxiliary plant output to produce a supply of dilution air for providing to the reduced temperature exhaust gas to effect a further reduction of temperature of the exhaust gas prior to passing the reduced temperature exhaust gas through the SCR system.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
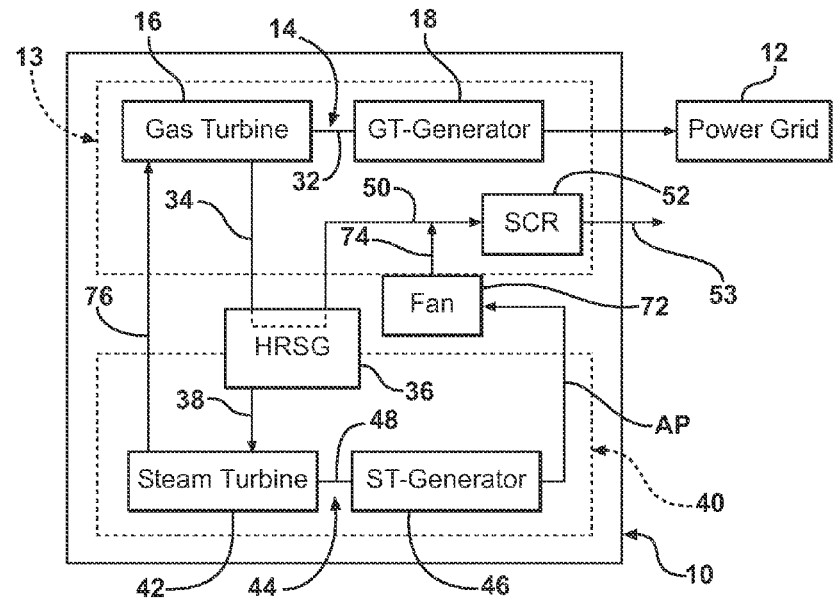
FIG. 1 is a schematic illustration of a power plant incorporating components of the present invention.

Referring to FIG. 1, there is shown a schematic diagram of a gas turbine power plant 10 in accordance with an embodiment of the present invention, such as a power plant for supplying electrical power to a power grid 12. The power plant 10 includes a plant power output unit 13 comprising a gas turbine and generator assembly 14 including a gas turbine 16 and a gas turbine generator 18 connected to the gas turbine 16 for producing the electrical power output provided to the power grid 12.

Figure 2:
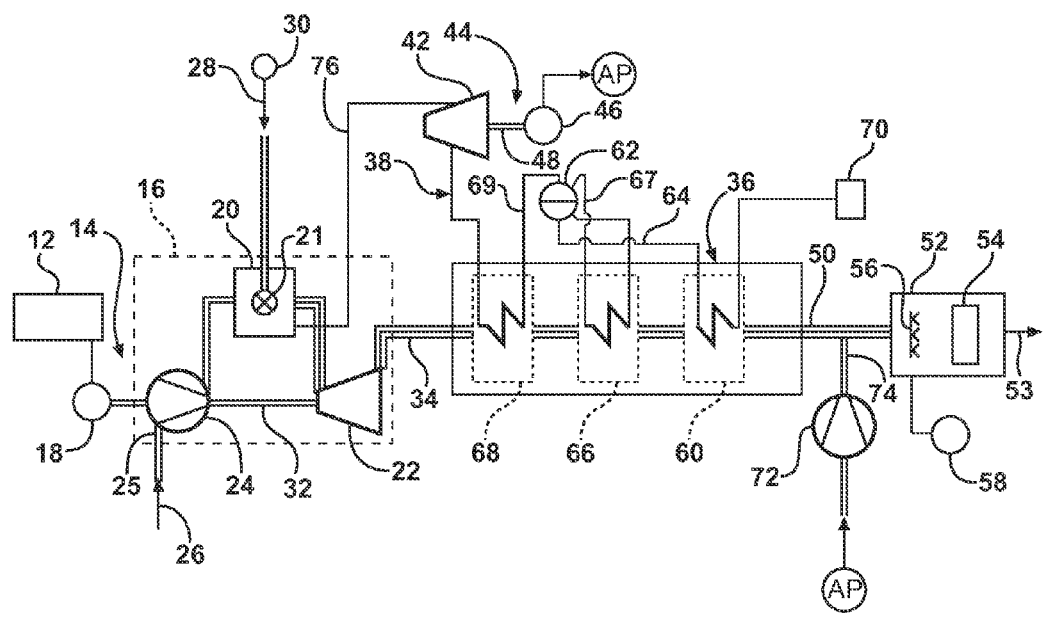
FIG. 2 is a diagrammatic illustration of an embodiment of the present invention.

Referring additionally to FIG. 2, the gas turbine 16 generally comprises a combustor 20 section including a combustor 21, a turbine section 22 and a compressor 24. Air 26 enters an inlet of the compressor at 25 and is compressed as it travels through the compressor 24. After traveling through the compressor 24, the air 26 enters the combustor section 20 where fuel 28 is supplied from a fuel source 30. The air 26 and fuel 28 are mixed and ignited in the combustor 21 to form a hot working medium comprising combustion products of the burned air/fuel mixture. In the turbine section 22, the hot working medium expands, and the energy of the hot working medium is converted into work to drive a rotor shaft 32 for driving the compressor 24. Additionally, the rotor shaft 32 typically drives a load, which in the present embodiment comprises the generator 18.

The exhaust gas from the gas turbine 16, comprising an expanded hot working medium 34, is directed to a portion of the auxiliary plant power unit 40, providing energy to the auxiliary plant power unit 40. Specifically, the expanded hot working medium 34 is passed through a heat recovery steam generator (HRSG) 36 where heat energy is removed from the expanded hot working medium 34, lowering the temperature of the expanded hot working medium 34. Water is converted into steam provided in a water/steam circuit 38 passing through the HRSG 36, as is described further below, and the steam comprises a working medium for powering the auxiliary plant power unit 40 (FIG. 1). In particular, the steam is provided as a working medium to a steam turbine 42 of a steam turbine and generator assembly 44. The steam turbine and generator assembly 44 includes a steam turbine generator 46 driven by a rotor shaft 48 of the steam turbine 42 to produce auxiliary power for the power plant 10, as is described further below.

The exhaust gas that has passed through the HRSG 36 comprises a reduced temperature exhaust gas 50 that is directed to flow through a selective catalytic reduction (SCR) system 52 before being exhausted from the plant 10, i.e., exhausted to the atmosphere at 53. The SCR system 52 may comprise a system for reducing oxides of nitrogen ($NO_x$) to nitrogen ($N_2$) and water ($H_2O$), and generally may include using a catalytic converter 54 and a reducing agent supplied from a metering unit 56. In the present example the reducing agent may comprise ammonia ($NH_3$) supplied to the metering unit 56 from a source 58 of ammonia and sprayed into the exhaust gas stream. Such an SCR system 52 typically has an optimum operating temperature range from about 500° F. to about 850° F. for removal of $NO_x$ emissions and to avoid damage of a catalyst 54 in the catalytic converter at an upper temperature limit.

Referring to FIG. 2, the water/steam circuit 38 of the HRSG 36 includes a first pressure stage or high-pressure stage comprising a high-pressure preheater or economizer 60, which is connected to a high-pressure drum 62 through a conduit 64. The high-pressure drum 62 is connected to a high-pressure evaporator 66 via a recirculation conduit 67 for convectively recirculating the water from the drum 62 to the evaporator 66 and back to the drum 62, wherein steam is formed in an upper portion of the high-pressure drum 62. The high-pressure drum 62 is connected to a high-pressure superheater 68 by a conduit 69. The superheater 68 further heats the steam from the drum 62 to form superheated steam.

The water/steam circuit 38 is additionally provided with a make-up water source 70, providing make-up water to the economizer 60. As noted above, the heat energy for heating the water in the water/steam circuit 38 is provided by the expanded hot working medium 34 from the gas turbine 16, resulting in a substantial reduction in temperature of the expanded hot working medium 34 after passing through the HRSG 36. For example, in the present embodiment, the temperature of the hot working medium 34 entering the HRSG 36 may be in the range of from about 1050° F. to about 1175° F., and the temperature of the reduced temperature exhaust gas may be in the range of from about 900° F. to about 1000° F. Hence, the HRSG 36 of the present invention extracts heat from the expanded hot working medium 34 to provide a reduced exhaust temperature flow of exhaust gas to the SCR system 52, enabling an efficient emission reduction for the gas turbine 16 through implementation of the SCR system 52.

In accordance with a further aspect of the invention, the auxiliary plant power unit 40 provides auxiliary power to further condition the reduced temperature exhaust gas leaving the HRSG 36 without diminishing the power output of the gas turbine and generator assembly 16. In particular, the steam turbine 42 of the auxiliary plant power unit 40 receives the superheated steam from the HRSG 36 at a predetermined design pressure for the turbine 42, and the steam is expanded through the turbine 42 to provide work comprising an output through the steam turbine outlet shaft 48. The steam turbine 42 preferably comprises a single pressure turbine driving the steam turbine generator 46 to produce approximately 6-10 MW of auxiliary power, identified as "AP" in FIGS. 1 and 2, for use in powering one or more auxiliary components within the power plant 10. The auxiliary power from the steam turbine and generator assembly 44 may be provided solely for a power system of the power plant 10, such as to power auxiliary equipment within the power plant 10.

In accordance with an aspect of the invention, the auxiliary power, AP, from the steam turbine and generator assembly 44 is provided to power an auxiliary fan 72 for supplying dilution (cooling) air 74 to the reduced temperature exhaust gas 50. The dilution air 74 provided by the auxiliary fan 72 further cools the reduced temperature exhaust gas 50 prior to the gas 50 passing into the SCR system 52. For example, the dilution air may reduce the exhaust gas temperature to about 850° F. prior to entering the SCR system 52. It should be noted that the auxiliary fan 72 may comprise one or more fans for supplying dilution air 74 to the reduced temperature exhaust gas 50.

The supply of dilution air 74 to the reduced temperature exhaust gas 50 further facilitates the use of the SCR system 52 with the gas turbine 16. In particular, it should be noted that the provision of the auxiliary plant power unit 40 enables the SCR system 52 to be implemented to reduce emissions from the power plant 10 by reducing the temperature of the expanded working medium 34 from the gas turbine 16 to an acceptable level for the SCR system, without drawing on the power plant output provided by the gas turbine and generator assembly 14. Hence, a conversion of the waste energy from the gas turbine 16 occurs in the auxiliary power plant unit 40 to provide an efficient cooling of the expanded working medium for emissions reduction in an SCR system 52, enabling the plant power output unit 13 to operate in a manner substantially similar to that of a simple cycle gas turbine plant, but with reduced emissions.

The expanded steam exhaust from the steam turbine 42 may be used to augment the output of the gas turbine and generator assembly 14. Specifically, the expanded steam exhaust, designated at 76 in FIG. 2, may be provided to the combustion section 20 of the gas turbine 16 to increase an energy level of the hot working medium provided from the combustor 21. The steam turbine 42 and the HRSG 36 are designed such that the pressure of the superheated steam 38 is reduced to a predetermined level as the steam passes through the steam turbine 42, where the predetermined pressure of the expanded steam exhaust 76 is greater than the pressure within the combustor section 20 to permit flow of the expanded steam exhaust 76 from the steam turbine 42 into the combustor section 20. Substantially all of the expanded steam exhaust 76 from the combustor section 20 may be provided to the turbine 16, i.e., to the combustor section 20 of the turbine 16.

It may be seen that, since substantially all of the steam exhausted from the steam turbine 42 is provided to the gas turbine 16, 100% make-up water may be required from the make-up water source 70. Further, it is not necessary to provide the water/steam circuit 38 with a condenser, since the expanded steam exhaust 76 is used for increasing the energy level of the hot working medium, improving the power output of the gas turbine and generator assembly 14.

The gas turbine power plant 10 described herein provides a reduction in emissions through implementation of an SCR system, while adding a minimum of additional equipment, and thereby substantially minimizing any additional complexity and associated costs of implementing the emissions reduction. Such a reduction is achieved by utilizing single pressure HRSG 36 to provide heat-exchanging surfaces for reducing the gas turbine exhaust temperatures, and producing augmentation steam in the HRSG 36 for a relatively small steam turbine 42, i.e., a steam turbine with an output of about 6-10 MW. Further, the steam turbine 42 operates on a single steam pressure to produce an auxiliary electrical power output for providing dilution air for further reducing the exhaust gas temperature without reducing the available output of the plant power output unit 13. In addition, the expanded steam exhaust from the steam turbine 42 may be directed to the power generation side of the plant 10, rather than implementing a condenser and associated pumps, further resulting in a minimization of complexity, space and cost required for additional equipment.

The present power plant 10 retains desirable characteristics associated with simple cycle gas turbine plants, e.g., lower capital costs and reduced complexity as compared to conventional combined cycle plants, while including advantages typically associated with combined cycle plants, such as reduced exhaust gas temperatures and the corresponding ability to implement an SCR system to reduce emissions. That is, the power plant 10 effects a thermal operating efficiency such that the net power output provided by the gas turbine and generator assembly 14 may remain at substantially the same level as a simple cycle gas turbine plant configuration with similar gross power output specifications that does not include an SCR system.

Further, it may be noted that the HRSG 36 for the reducing the exhaust gas temperature and producing steam may be designed so as to permit a fast start up of the gas turbine engine 16. For example, the HRSG 36 may be designed with thin wall materials that avoid large temperature differentials and associated thermal stresses through the materials of the HRSG 36. Hence, the gas turbine 16 may be brought up to a full operating temperature without being restricted by the thermal characteristics of the HRSG 36.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of implementing an auxiliary power output of a gas turbine power plant to reduce emissions of the power plant, the method comprising:
   providing a gas turbine and generator assembly;
   operating the gas turbine with a fuel to produce a hot working medium producing work and creating an expanded working medium;
   removing heat from the expanded working medium leaving the gas turbine in a heat recovery steam generator (HRSG) to form a reduced temperature exhaust gas;
   generating steam in the HRSG from the heat removed from the expanded working medium;
   passing the reduced temperature exhaust gas through a selective catalytic reduction (SCR) system;
   providing an auxiliary plant power unit comprising a steam turbine and generator assembly;
   operating the steam turbine with the steam generated in the HRSG to produce an expanded steam exhaust, and producing an auxiliary plant output at the generator connected to the steam turbine; and
   using the auxiliary plant output to produce a supply of dilution air, and providing the dilution air to the reduced temperature exhaust gas to effect a further reduction of temperature of the exhaust gas prior to passing the reduced temperature exhaust gas through the SCR system.

2. The method of claim 1, including providing substantially all of the expanded steam exhaust from the steam turbine to the gas turbine to increase an energy level of the hot working medium.

3. The method of claim 2, wherein the expanded steam exhaust is at a predetermined higher pressure than a pressure within a combustor section of the gas turbine, and wherein the expanded steam exhaust is provided to the combustor section of the gas turbine.

4. The method of claim 2, wherein the steam turbine operates at a single steam cycle pressure.

5. The method of claim 4, wherein the gas turbine plant is operated without a condenser in a steam cycle for the steam turbine.

6. The method of claim 1, wherein substantially all of the auxiliary plant output produced at the steam turbine and generator assembly is used to power auxiliary processes at the gas turbine plant.

7. The method of claim 6, wherein the steam turbine and generator assembly comprises a generator producing an output in the range of from about 6 MW to about 10 MW.

8. A method of implementing an auxiliary power output of a gas turbine power plant to reduce emissions of the power plant, the method comprising:
- providing a gas turbine and generator assembly, the gas turbine including a combustor section;
- operating the gas turbine with a fuel to produce a hot working medium producing work and creating an expanded working medium;
- removing heat from the expanded working medium leaving the gas turbine in a heat recovery steam generator (HRSG) to form a reduced temperature exhaust gas, wherein the expanded working medium leaving the gas turbine passes directly to the HRSG where the reduced temperature exhaust gas is then formed;
- generating steam in the HRSG from the heat removed from the expanded working medium;
- passing the reduced temperature exhaust gas from the HRSG through a selective catalytic reduction (SCR) system;
- providing an auxiliary plant power unit comprising a steam turbine and generator assembly;
- operating the steam turbine with the steam generated in the HRSG to produce an expanded steam exhaust; and
- providing the expanded steam exhaust to the combustor section of the gas turbine to increase an energy level of the hot working medium.

9. The method of claim 8, wherein substantially all of the expanded steam exhaust from the steam turbine is provided to the combustor of the gas turbine.

10. The method of claim 9, wherein the expanded steam exhaust is at a predetermined higher pressure than a pressure within a combustor section of the gas turbine, and wherein the expanded steam exhaust is provided to the combustor section of the gas turbine.

11. The method of claim 10, wherein the steam turbine operates at a single steam cycle pressure.

12. The method of claim 8, wherein the gas turbine plant is operated without a condenser in a steam cycle for the steam turbine.

13. The method of claim 8, including producing an auxiliary plant output from the steam turbine and generator assembly, using the auxiliary plant output to produce a supply of dilution air, and providing the dilution air to the reduced temperature exhaust gas to effect a further reduction of temperature of the exhaust gas prior to passing the reduced temperature exhaust gas through the SCR system.

14. A gas turbine power plant implementing an auxiliary power output of the power plant to reduce emissions, the power plant comprising:
- a gas turbine and generator assembly for producing power, the gas turbine operating with a fuel to produce a hot working medium producing work and creating an exhaust gas comprising an expanded working medium;
- a heat recovery steam generator (HRSG) receiving the expanded working medium and removing heat from the expanded working medium to form a reduced temperature exhaust gas and to generate steam from the heat removed from the expanded working medium;
- a steam turbine and generator assembly producing power from the steam generated at the HRSG to produce an auxiliary plant output;
- a selective catalytic reduction (SCR) system receiving the reduced temperature exhaust gas; and
- an auxiliary fan powered by the auxiliary plant output to produce a supply of dilution air for providing to the reduced temperature exhaust gas to effect a further reduction of temperature of the exhaust gas prior to passing the reduced temperature exhaust gas through the SCR system.

15. The gas power plant of claim 14, including a steam exhaust connection to transfer expanded steam exhaust from an output of the steam turbine to the gas turbine to effect an increase in the energy level of the hot working medium.

16. The gas power plant of claim 15, wherein the steam exhaust connection is connected to a combustor section of the gas turbine for transferring the expanded steam exhaust to the combustor section.

17. The gas power plant of claim 15, wherein the steam exhaust connection comprises a sole outlet for steam transferred out of the steam turbine for effecting transfer of substantially all steam from the steam turbine to the gas turbine.

18. The gas power plant of claim 14, wherein the steam turbine operates on a single steam cycle pressure.

19. The gas power plant of claim 18, wherein a steam cycle for the steam turbine of the gas power plant does not include a condenser.

20. The gas power plant of claim 14, wherein the gas turbine and generator assembly provides power to a power grid, and the steam turbine and generator assembly is connected solely to a power system for the gas power plant.

* * * * *